(12) United States Patent
Chila et al.

(10) Patent No.: US 9,765,973 B2
(45) Date of Patent: Sep. 19, 2017

(54) SYSTEM AND METHOD FOR TUBE LEVEL AIR FLOW CONDITIONING

(71) Applicant: General Electric Company, Schenectady, NY (US)

(72) Inventors: Ronald James Chila, Greenfield Center, NY (US); Patrick Benedict Melton, Horse Shoe, NC (US); Gregory Allen Boardman, Greer, SC (US); James Harold Westmoreland, Greer, SC (US)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 840 days.

(21) Appl. No.: 13/797,986

(22) Filed: Mar. 12, 2013

(65) Prior Publication Data

US 2014/0338338 A1    Nov. 20, 2014

(51) Int. Cl.
| | | |
|---|---|---|
| F02C 1/00 | (2006.01) | |
| F23R 3/28 | (2006.01) | |
| F23R 3/10 | (2006.01) | |
| F23D 14/62 | (2006.01) | |

(52) U.S. Cl.
CPC ............. *F23R 3/286* (2013.01); *F23D 14/62* (2013.01); *F23R 3/10* (2013.01); *Y02T 50/675* (2013.01)

(58) Field of Classification Search
CPC .. F02C 3/145; F02C 7/22; F02C 7/222; F23R 3/002; F23R 3/04; F23R 3/045; F23R 3/10; F23R 3/28; F23R 3/286; F23R 3/283; F23R 3/30; F23R 3/32; F23R 3/40; F23R 3/54

USPC .................................. 60/737, 796; 239/405
See application file for complete search history.

(56) References Cited

U.S. PATENT DOCUMENTS

| | | |
|---|---|---|
| 1,855,165 A | 4/1932 | Barker |
| 2,564,042 A | 8/1951 | Walker |
| 3,581,492 A | 6/1971 | Norgren et al. |
| 3,751,911 A | 8/1973 | De Tartaglia |
| 4,100,733 A | 7/1978 | Striebel et al. |
| 4,408,461 A | 10/1983 | Bruhwiler et al. |
| 4,587,809 A | 5/1986 | Ohmori et al. |
| 4,763,481 A | 8/1988 | Cannon |
| 4,796,429 A | 1/1989 | Verdouw |
| 5,121,597 A | 6/1992 | Urushidani et al. |
| 5,161,366 A | 11/1992 | Beebe |
| 5,235,814 A | 8/1993 | Leonard |
| 5,274,991 A * | 1/1994 | Fitts ........................ F23R 3/283 60/39.37 |

(Continued)

OTHER PUBLICATIONS

U.S. Appl. No. 13/797,848, filed Mar. 12, 2013, Boardman et al.

(Continued)

*Primary Examiner* — Phutthiwat Wongwian
*Assistant Examiner* — Jason T Newton
(74) *Attorney, Agent, or Firm* — Fletcher Yoder, P.C.

(57) ABSTRACT

A system includes a multi-tube fuel nozzle. The multi-tube fuel nozzle includes multiple mixing tubes. Each mixing tube includes an annular wall disposed about a central passage and an air inlet region configured to be disposed about a fuel injector extending into the central passage. The central passage extends from an upstream end to a downstream end of the annular wall relative to a direction of flow through the central passage. The air inlet region includes an air entry surface of the annular wall that gradually decreases in diameter in the direction of flow.

20 Claims, 13 Drawing Sheets

(56) References Cited

U.S. PATENT DOCUMENTS

| | | | |
|---|---|---|---|
| 5,361,586 A | 11/1994 | McWhirter et al. | |
| 5,410,884 A | 5/1995 | Fukue et al. | |
| 5,415,000 A | 5/1995 | Mumford et al. | |
| 5,515,680 A | 5/1996 | Fujimura et al. | |
| 5,611,196 A | 3/1997 | Wilson | |
| 5,675,971 A | 10/1997 | Angel et al. | |
| 5,778,676 A | 7/1998 | Joshi et al. | |
| 5,816,049 A | 10/1998 | Joshi | |
| 5,822,992 A | 10/1998 | Dean | |
| 5,901,555 A | 5/1999 | Mandai et al. | |
| 5,927,076 A | 7/1999 | Pillsbury | |
| 5,943,866 A | 8/1999 | Lovett et al. | |
| 6,016,658 A | 1/2000 | Willis et al. | |
| 6,026,645 A | 2/2000 | Stokes et al. | |
| 6,038,861 A | 3/2000 | Amos et al. | |
| 6,092,363 A | 7/2000 | Ryan | |
| 6,164,055 A | 12/2000 | Lovett et al. | |
| 6,334,309 B1 | 1/2002 | Dean et al. | |
| 6,351,948 B1 | 3/2002 | Goeddeke | |
| 6,360,776 B1 | 3/2002 | McCormick et al. | |
| 6,363,724 B1 | 4/2002 | Bechtel et al. | |
| 6,438,959 B1 | 8/2002 | Dean et al. | |
| 6,438,961 B2 | 8/2002 | Tuthill et al. | |
| 6,530,222 B2 | 3/2003 | Stuttaford et al. | |
| 6,532,742 B2 | 3/2003 | Scarinci et al. | |
| 6,705,087 B1 * | 3/2004 | Ohri | F23R 3/14 60/748 |
| 6,832,483 B2 | 12/2004 | Moriya et al. | |
| 6,880,340 B2 | 4/2005 | Saitoh | |
| 6,928,823 B2 | 8/2005 | Inoue et al. | |
| 6,983,600 B1 | 1/2006 | Dinu et al. | |
| 7,007,478 B2 | 3/2006 | Dinu | |
| 7,007,486 B2 | 3/2006 | Sprouse et al. | |
| 7,021,562 B2 | 4/2006 | Mansour et al. | |
| 7,134,287 B2 | 11/2006 | Belsom et al. | |
| 7,171,813 B2 | 2/2007 | Tanaka et al. | |
| 7,181,916 B2 | 2/2007 | Ziminsky et al. | |
| 7,284,378 B2 | 10/2007 | Amond, III et al. | |
| 7,469,544 B2 | 12/2008 | Farhangi | |
| 7,578,130 B1 | 8/2009 | Kraemer et al. | |
| 7,617,682 B2 | 11/2009 | Bruck | |
| 7,841,180 B2 | 11/2010 | Kraemer et al. | |
| 7,841,182 B2 | 11/2010 | Martin | |
| 7,900,456 B2 | 3/2011 | Mao | |
| 8,042,339 B2 * | 10/2011 | Lacy | F23R 3/28 60/737 |
| 8,065,880 B2 | 11/2011 | Ishizaka et al. | |
| 8,079,218 B2 | 12/2011 | Widener | |
| 8,104,291 B2 | 1/2012 | Myers et al. | |
| 8,122,721 B2 | 2/2012 | Johnson et al. | |
| 8,205,452 B2 | 6/2012 | Boardman et al. | |
| 8,234,871 B2 | 8/2012 | Davis, Jr. et al. | |
| 8,234,872 B2 | 8/2012 | Berry et al. | |
| 8,240,151 B2 | 8/2012 | Pelletier et al. | |
| 8,266,912 B2 | 9/2012 | Berry et al. | |
| 8,276,385 B2 | 10/2012 | Zuo et al. | |
| 8,322,143 B2 | 12/2012 | Uhm et al. | |
| 8,327,642 B2 | 12/2012 | Uhm et al. | |
| 8,402,763 B2 | 3/2013 | Mulherin et al. | |
| 8,408,004 B2 | 4/2013 | Davis, Jr. et al. | |
| 8,424,311 B2 | 4/2013 | York et al. | |
| 8,438,853 B2 | 5/2013 | Green et al. | |
| 8,474,265 B2 | 7/2013 | Jain et al. | |
| 8,484,978 B2 | 7/2013 | Bailey et al. | |
| 8,505,304 B2 | 8/2013 | Myers et al. | |
| 8,522,555 B2 | 9/2013 | Berry et al. | |
| 8,528,334 B2 | 9/2013 | Dutta et al. | |
| 8,528,336 B2 | 9/2013 | Cihlar et al. | |
| 8,572,979 B2 | 11/2013 | Smith et al. | |
| 8,616,002 B2 | 12/2013 | Kraemer et al. | |
| 8,701,419 B2 | 4/2014 | Hughes | |
| 8,789,372 B2 | 7/2014 | Johnson et al. | |
| 8,800,289 B2 | 8/2014 | Johnson et al. | |
| 8,850,821 B2 | 10/2014 | Khan et al. | |
| 8,899,049 B2 | 12/2014 | Krull et al. | |
| 8,904,797 B2 | 12/2014 | Berry et al. | |
| 8,919,127 B2 | 12/2014 | Melton et al. | |
| 8,938,978 B2 | 1/2015 | Bailey et al. | |
| 9,032,704 B2 | 5/2015 | Crothers et al. | |
| 9,151,502 B2 | 10/2015 | Crothers et al. | |
| 9,163,839 B2 | 10/2015 | Westmoreland et al. | |
| 9,200,571 B2 | 12/2015 | Bailey et al. | |
| 9,255,711 B2 | 2/2016 | Crothers et al. | |
| 9,316,397 B2 | 4/2016 | Stewart et al. | |
| 2001/0052229 A1 | 12/2001 | Tuthill et al. | |
| 2002/0014078 A1 | 2/2002 | Mandai et al. | |
| 2002/0119412 A1 | 8/2002 | Loving | |
| 2002/0128790 A1 | 9/2002 | Woodmansee | |
| 2002/0192615 A1 | 12/2002 | Moriya et al. | |
| 2003/0014975 A1 | 1/2003 | Nishida et al. | |
| 2003/0037549 A1 * | 2/2003 | Mandai | F23D 14/74 60/746 |
| 2003/0089801 A1 | 5/2003 | Saitoh et al. | |
| 2004/0006990 A1 | 1/2004 | Stuttaford et al. | |
| 2004/0006991 A1 | 1/2004 | Stuttaford et al. | |
| 2004/0006992 A1 | 1/2004 | Stuttaford et al. | |
| 2004/0006993 A1 | 1/2004 | Stuttaford et al. | |
| 2004/0060297 A1 | 4/2004 | Koenig et al. | |
| 2004/0142294 A1 | 7/2004 | Niass et al. | |
| 2004/0163392 A1 | 8/2004 | Nishida et al. | |
| 2007/0289305 A1 | 12/2007 | Oda et al. | |
| 2008/0053097 A1 | 3/2008 | Han et al. | |
| 2008/0078179 A1 | 4/2008 | Cai | |
| 2008/0163627 A1 | 7/2008 | ELKady et al. | |
| 2009/0229269 A1 | 9/2009 | Lacy et al. | |
| 2009/0241547 A1 * | 10/2009 | Luts | F02C 7/22 60/737 |
| 2009/0280443 A1 | 11/2009 | Carroni et al. | |
| 2010/0064691 A1 | 3/2010 | Laster et al. | |
| 2010/0089065 A1 | 4/2010 | Tuthill | |
| 2010/0192579 A1 | 8/2010 | Boardman et al. | |
| 2010/0192583 A1 | 8/2010 | Cano Wolff et al. | |
| 2010/0192586 A1 | 8/2010 | Terada et al. | |
| 2010/0205970 A1 | 8/2010 | Hessler et al. | |
| 2010/0218501 A1 * | 9/2010 | York | F23R 3/286 60/737 |
| 2010/0236252 A1 | 9/2010 | Huth | |
| 2010/0263384 A1 | 10/2010 | Chila | |
| 2011/0005230 A1 | 1/2011 | Bailey et al. | |
| 2011/0016866 A1 | 1/2011 | Boardman et al. | |
| 2011/0016871 A1 | 1/2011 | Kraemer et al. | |
| 2011/0107764 A1 | 5/2011 | Bailey et al. | |
| 2011/0113783 A1 * | 5/2011 | Boardman | F23C 13/06 60/723 |
| 2011/0197591 A1 | 8/2011 | Valeev et al. | |
| 2011/0209481 A1 | 9/2011 | Simmons | |
| 2011/0314823 A1 * | 12/2011 | Smith | F23R 3/002 60/737 |
| 2012/0047902 A1 | 3/2012 | Tuthill | |
| 2012/0055167 A1 * | 3/2012 | Johnson | F01D 9/023 60/776 |
| 2012/0073302 A1 | 3/2012 | Myers et al. | |
| 2012/0180487 A1 | 7/2012 | Uhm et al. | |
| 2012/0180488 A1 | 7/2012 | Bailey et al. | |
| 2012/0181354 A1 * | 7/2012 | Bailey | B22D 25/00 239/403 |
| 2012/0227371 A1 | 9/2012 | Johnson et al. | |
| 2012/0324896 A1 | 12/2012 | Kim et al. | |
| 2013/0025285 A1 | 1/2013 | Stewart et al. | |
| 2013/0067920 A1 | 3/2013 | Fox et al. | |
| 2013/0074503 A1 | 3/2013 | Rohrssen et al. | |
| 2013/0086912 A1 | 4/2013 | Berry | |
| 2013/0104554 A1 | 5/2013 | Bode et al. | |
| 2013/0125549 A1 | 5/2013 | Bailey et al. | |
| 2013/0180256 A1 | 7/2013 | Stoia | |
| 2013/0213051 A1 | 8/2013 | Westmoreland, III et al. | |
| 2013/0232977 A1 | 9/2013 | Siddagangaiah et al. | |
| 2013/0232979 A1 | 9/2013 | Singh | |
| 2013/0299602 A1 | 11/2013 | Hughes et al. | |
| 2014/0033718 A1 | 2/2014 | Manoharan et al. | |
| 2014/0033722 A1 | 2/2014 | Abdel-Hafez et al. | |
| 2014/0109587 A1 | 4/2014 | Crothers et al. | |
| 2014/0245738 A1 | 9/2014 | Crothers et al. | |
| 2014/0260259 A1 | 9/2014 | Ginesin et al. | |

(56) References Cited

U.S. PATENT DOCUMENTS

| | | |
|---|---|---|
| 2014/0260267 A1 | 9/2014 | Melton et al. |
| 2014/0260268 A1 | 9/2014 | Westmoreland et al. |
| 2014/0260271 A1 | 9/2014 | Keener et al. |
| 2014/0260276 A1* | 9/2014 | Westmoreland ........ F23R 3/286 60/746 |
| 2014/0260299 A1 | 9/2014 | Boardman et al. |
| 2014/0260300 A1* | 9/2014 | Chila ..................... F23R 3/286 60/776 |
| 2014/0260315 A1* | 9/2014 | Westmoreland .......... F02C 7/20 60/796 |
| 2014/0283522 A1 | 9/2014 | Boardman et al. |
| 2014/0338338 A1 | 11/2014 | Chila et al. |
| 2014/0338339 A1* | 11/2014 | Westmoreland .......... F23R 3/12 60/737 |
| 2014/0338340 A1* | 11/2014 | Melton ................... F23D 14/62 60/738 |
| 2014/0338344 A1 | 11/2014 | Stewart et al. |
| 2014/0338354 A1 | 11/2014 | Stewart et al. |
| 2014/0338356 A1 | 11/2014 | Keener et al. |
| 2014/0367495 A1* | 12/2014 | Monaghan ........... F02M 55/008 239/408 |
| 2015/0000285 A1 | 1/2015 | Deiss et al. |
| 2015/0059353 A1 | 3/2015 | Asai et al. |
| 2015/0165568 A1 | 6/2015 | Means et al. |
| 2016/0040883 A1 | 2/2016 | Asai et al. |
| 2016/0060154 A1 | 3/2016 | Cowles et al. |

OTHER PUBLICATIONS

U.S. Appl. No. 13/797,859, filed Mar. 12, 2013, Boardman et al.
U.S. Appl. No. 13/797,883, filed Mar. 12, 2013, Melton et al.
U.S. Appl. No. 13/797,896, filed Mar. 12, 2013, Westmoreland et al.
U.S. Appl. No. 13/797,912, filed Mar. 12, 2013, Chila et al.
U.S. Appl. No. 13/797,925, filed Mar. 12, 2013, Westmoreland et al.
U.S. Appl. No. 13/797,961, filed Mar. 12, 2013, Westmoreland et al.
U.S. Appl. No. 13/798,012, filed Mar. 12, 2013, Melton et al.
U.S. Appl. No. 13/798,027, filed Mar. 12, 2013, Westmoreland et al.
U.S. Appl. No. 13/400,248, filed Feb. 20, 2012, Westmoreland et al.
U.S. Appl. No. 13.705,443, filed Dec. 3, 2012, Belsom et al.

* cited by examiner

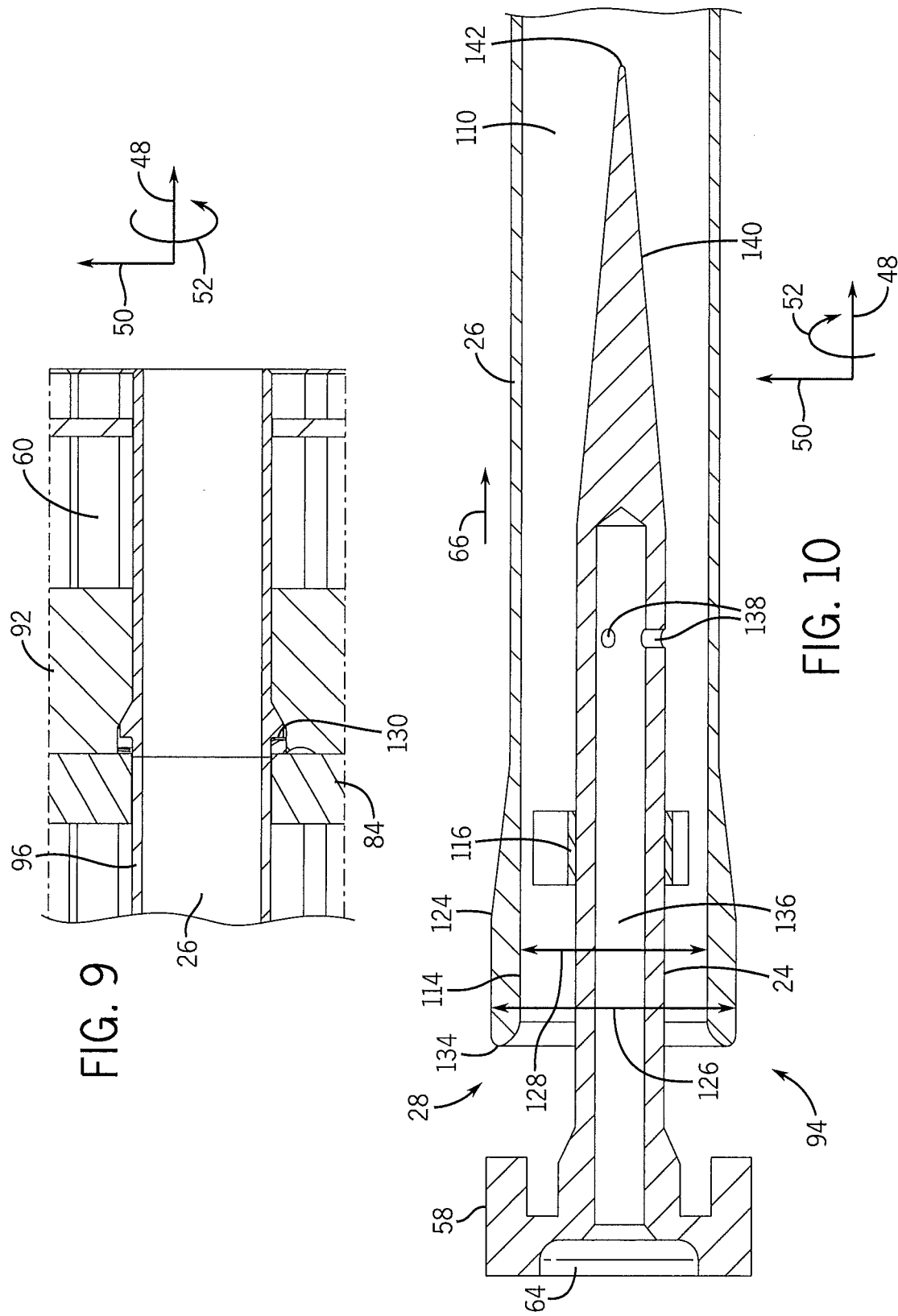

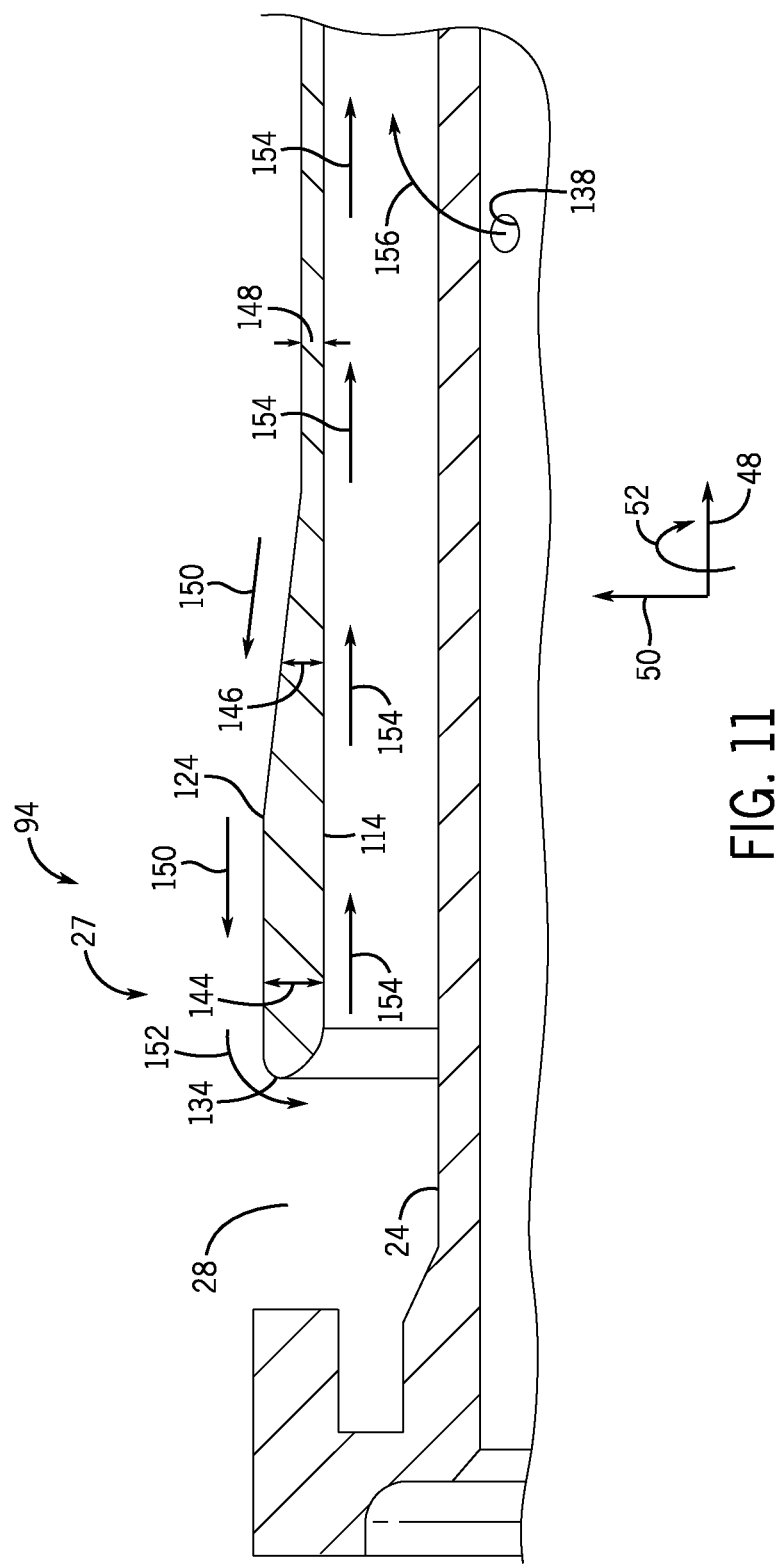

SYSTEM AND METHOD FOR TUBE LEVEL AIR FLOW CONDITIONING

BACKGROUND OF THE INVENTION

The subject matter disclosed herein relates to tube level air flow conditioning for turbine systems.

Gas turbine systems generally include one or more combustors that combust a mixture of compressed air and fuel to produce hot combustion gases. Unfortunately, existing combustors may receive fuel and air at pressures and/or flow rates, which can fluctuate due to various limitations of the combustors, fuel nozzles, and associated equipment. These air and fuel fluctuations may drive or cause fluctuations in the fuel to air ratio, thereby increasing the possibility of flame holding, flashback, and/or increased emissions (e.g., nitrogen oxides). Conventional systems can also be slower at achieving mixing therefore reducing the overall efficiency of the system. There is therefore a need for a system that can achieve faster and more uniform fuel air mixing while also being durable and easily maintainable.

BRIEF DESCRIPTION OF THE INVENTION

Certain embodiments commensurate in scope with the originally claimed invention are summarized below. These embodiments are not intended to limit the scope of the claimed invention, but rather these embodiments are intended only to provide a brief summary of possible forms of the invention. Indeed, the invention may encompass a variety of forms that may be similar to or different from the embodiments set forth below.

In a first embodiment, a system includes a multi-tube fuel nozzle. The multi-tube fuel nozzle includes multiple mixing tubes. Each mixing tube includes an annular wall disposed about a central passage and an air inlet region configured to be disposed about a fuel injector extending into the central passage. The central passage extends from an upstream end to a downstream end of the annular wall relative to a direction of flow through the central passage. The air inlet region includes an air entry surface of the annular wall that gradually decreases in diameter in the direction of flow.

In accordance with a second embodiment, a system includes an end cover assembly and a multi-tube fuel nozzle. The multi-tube fuel nozzle includes a retainer plate, and multiple tubes disposed between the end cover assembly and the retainer plate. Each tube includes an annular wall disposed about a central passage and an air inlet region configured to be disposed about a fuel injector extending into the central passage. The central passage extends from an upstream end of the annular wall adjacent the end cover assembly to a downstream end of the annular wall adjacent the retainer plate. The air inlet region includes a bell-shaped portion.

In a third embodiment, a method for removal of tubes from a multi-tube fuel nozzle includes removing the multi-tube fuel nozzle having multiple tubes disposed between a retainer plate and an end cover assembly from a gas turbine engine. Each tube includes an annular wall disposed about a central passage. The central passage extends from an upstream end of an annular wall adjacent the end cover assembly to a downstream end of the annular wall adjacent the retainer plate, and the each tube includes an air inlet region disposed about a fuel injector that extends into the central passage. The air inlet region includes a bell-shaped portion. The method also includes removing the end cover assembly from the multi-tube fuel nozzle, removing the retainer plate from the multi-tube fuel nozzle by sliding the retainer plate along the plurality of tubes from the upstream end to the downstream end of each tube, and removing at least one tube from the multi-tube fuel nozzle.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein:

FIG. 9 is a cross-sectional side view of an embodiment of the mixing tube and cap face assembly, taken within line 9-9 of FIG. 6;

FIG. 10 is a cross-sectional side view of an embodiment of the mixing tube and fuel injector illustrating an air flow conditioner, taken within line 10-10 of FIG. 6;

FIG. 11 is a partial view of the embodiment of the mixing tube and fuel injector of FIG. 10, illustrating details of air flow entering the tube.

DETAILED DESCRIPTION OF THE INVENTION

Figure 1:
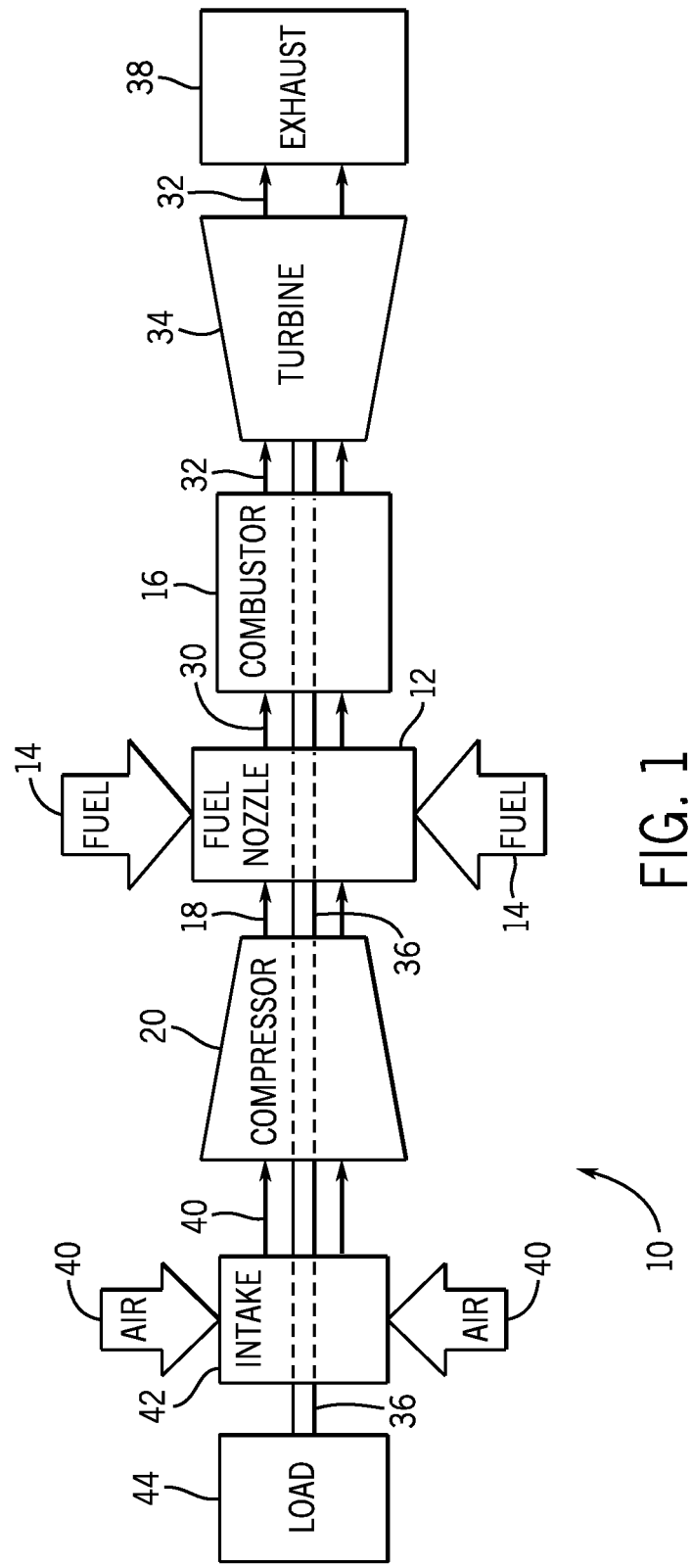
FIG. 1 is a block diagram of an embodiment of a gas turbine system having a multi-tube fuel nozzle within a combustor, wherein the tubes are configured to uniformly distribute air.

One or more specific embodiments of the present invention will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present invention, the articles "a," "an," "the," and "said" are intended to mean that there are one or more of the elements. The terms "comprising," "including," and "having" are intended to be inclusive and mean that there may be additional elements other than the listed elements.

The present disclosure is directed to systems for conditioning air flow within a multi-tube fuel nozzle of a turbine system. The turbine system may include one or more multi-tube fuel nozzles. Each multi-tube fuel nozzle includes multiple mixing tubes (e.g. premixing tubes). Each tube includes an annular wall disposed about a central passage and an air inlet region configured to be disposed about a fuel injector extending into the central passage. The central passage extends from an upstream end of the annular wall of the tube to a downstream end of the annular wall relative to a direction of flow through the central passage. The air inlet region includes an outer surface of the annular wall that gradually decreases in diameter in the direction of flow. In the multi-tube fuel nozzle, pressurized air may enter mixing tubes through the air inlet regions as the fuel injectors distribute fuel into the central passage, creating an air-fuel mixture. The air entry surface condition the air entering the mixing tubes and allow for substantially uniform mixing with the air before the mixture is subsequently directed into the combustion region. The air entry surface may be configured to target specific air side pressure drops, and best provide uniform air flow. Accordingly, the air entry surface may include a bell-shape. The air entry surface may include an inner surface that decreases in diameter along a portion of the air inlet region from the upstream end to the downstream end. A cross-sectional area within the inner surface of the air entry surface may decrease in the direction of flow. The air inlet region may include a contoured end that is configured to reduce pressure loss as air flows into the central passage through the air inlet region. The contoured end may include a contoured outer surface, a contoured inner surface, and a contoured turn portion disposed between the contoured outer surface and the contoured inner surface. The multi-tube fuel nozzle may comprise multiple premixer tubes, each premixer tube including the air inlet region. In the multi-tube fuel nozzle including multiple premixer tubes, clearances between the air entry surfaces of adjacent premixer tubes may be configured to accelerate a flow of air into each of the premixer tubes.

Turning now to the drawings and referring first to FIG. 1, a block diagram of an embodiment of a gas turbine system 10 is illustrated. The gas turbine system 10 includes one or more fuel nozzles 12 (e.g., multi-tube fuel nozzles), a fuel supply 14, and a combustor 16. The fuel nozzle 12 receives compressed air 18 from an air compressor 20 and fuel 22 from a fuel supply 14. Although the present embodiments are discussed in context of air as an oxidant, the present embodiments may use air, oxygen, oxygen-enriched air, oxygen-reduced air, oxygen mixtures, or any combination thereof. As discussed in further detail below, the fuel nozzle 12 includes a plurality of fuel injectors 24 (e.g., 10 to 1000) and associated mixing tubes 26 (e.g., 10 to 1000), wherein each mixing tube 26 has an air flow conditioner 27 with an air entry surface 28 to direct and condition an air flow into the respective tube 26, and each mixing tube 26 has a respective fuel injector 24 (e.g., in a coaxial or concentric arrangement) to inject fuel into the respective tube 26. In turn, each mixing tube 26 mixes the air and fuel along its length, and then outputs an air-fuel mixture 30 into the combustor 16. In certain embodiments, the mixing tubes 26 may be described as micromixing tubes, which may have diameters between approximately 0.5 to 2, 0.75 to 1.75, or 1 to 1.5 centimeters. The mixing tubes 26 may be arranged in one or more bundles (e.g., 1, 2, 3, 4, 5, 6, 7, 8, 9, 10, or more) of closely spaced tubes, generally in a parallel arrangement relative to one another. In this configuration, each mixing tube 26 is configured to mix (e.g., micromix) on a relatively small scale within each mixing tube 26, which then outputs a fuel-air mixture 30 into the combustion chamber. The air flow conditioner 27 (e.g., with air entry surface 28) of the disclosed embodiments provides air conditioning on a tube level (i.e., for each individual mixing tube 26), such that the flow and/or pressure of air into each tube 26 and among the plurality of tubes 26 can be controlled to provide better mixing of fuel and air.

The combustor 16 ignites the fuel-air mixture 30, thereby generating pressurized exhaust gases 32 that flow into a turbine 34. The pressurized exhaust gases 32 flow against and between blades in the turbine 34, driving the turbine 34 to rotate. The turbine blades are coupled to a shaft 36, which in turn also rotates as the exhaust gases 32 escape the combustor 16. Eventually, the exhaust 32 of the combustion process exits the turbine system 10 via an exhaust outlet 38. Blades within the compressor 20 are additionally coupled to the shaft 36, and rotate as the shaft 36 is driven to rotate by the turbine 34. The rotation of the blades within the compressor 20 compresses air 40 that has been drawn into the compressor 20 by an air intake 42. The resulting compressed air 18 is then fed into the multi-tube fuel nozzle 12 of the combustors 16, as discussed above, where it is mixed with fuel 22 and ignited, creating a substantially self-sustaining process. Further, the shaft 36 may be coupled to load 44. As will be appreciated, the load 44 may be any suitable device that may generate power via the rotational output of a turbine system 10, such as a power generation plant or an external mechanical load. The relationship between the consistency of the fuel-air mixture 30 and the efficient operation of the gas turbine system 10 can therefore be appreciated. The implementation of the multiple mixing tubes 26, each having an air entry surface 28 to condition the compressed air 18 will be discussed in greater detail below.

Figure 2:
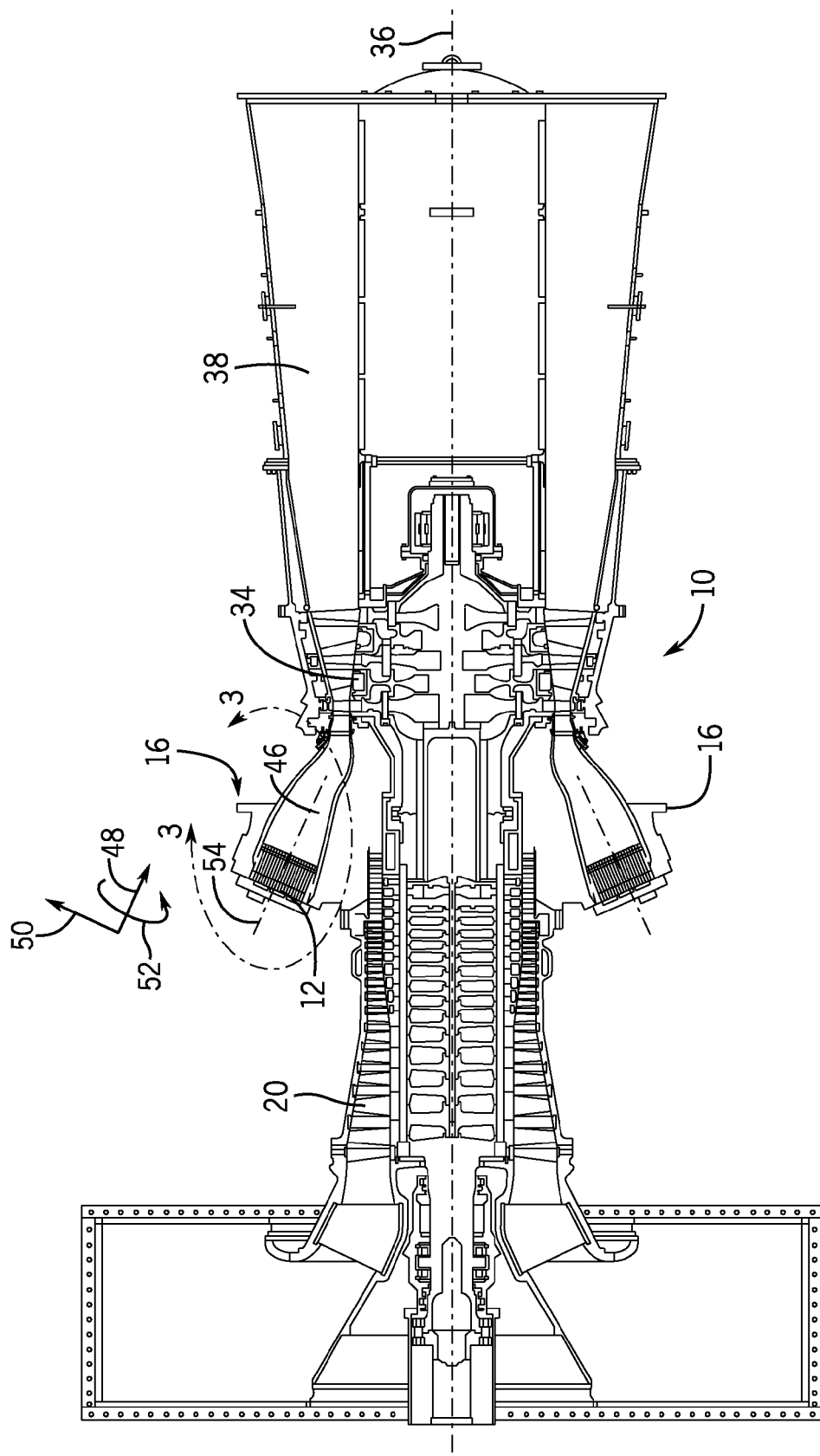
FIG. 2 is a cutaway side view of the embodiment of a gas turbine system of FIG. 1.

FIG. 2 shows a cutaway side view of the embodiment of gas turbine system 10 of FIG. 1. As depicted, the embodiment includes a compressor 20, which is coupled to an annular array of combustors 16. Each combustor 16 includes at least one fuel nozzle 12 (e.g., a multi-tube fuel nozzle) which feeds the fuel-air mixture 30 to a combustion chamber 46 located within each combustor 16. As will be discussed in detail below, certain embodiments of the mixing tubes 26 of the fuel nozzle 12 include unique features to more uniformly distribute the compressed air 18 creating a more uniform fuel-air mixture 30. Uniformity of the fuel-air mixture 30 provides more efficient combustion, thereby increasing performance and reducing emissions. Combustion of the fuel-air mixture 30 within combustors 16, as mentioned above in regard to FIG. 1, causes vanes or blades within the turbine 34 to rotate as exhaust gases 32 (e.g., combustion gases) pass toward an exhaust outlet 38. Throughout the discussion, a set of axes will be referenced. These axes are based on a cylindrical coordinate system and point in an axial direction 48, a radial direction 50, and a circumferential direction 52. For example, the axial direction 48 extends along a length or longitudinal axis 54 of the fuel nozzle 12, the radial direction 50 extends away from the longitudinal axis 54, and the circumferential direction 52 extends around the longitudinal axis 54.

Figure 3:
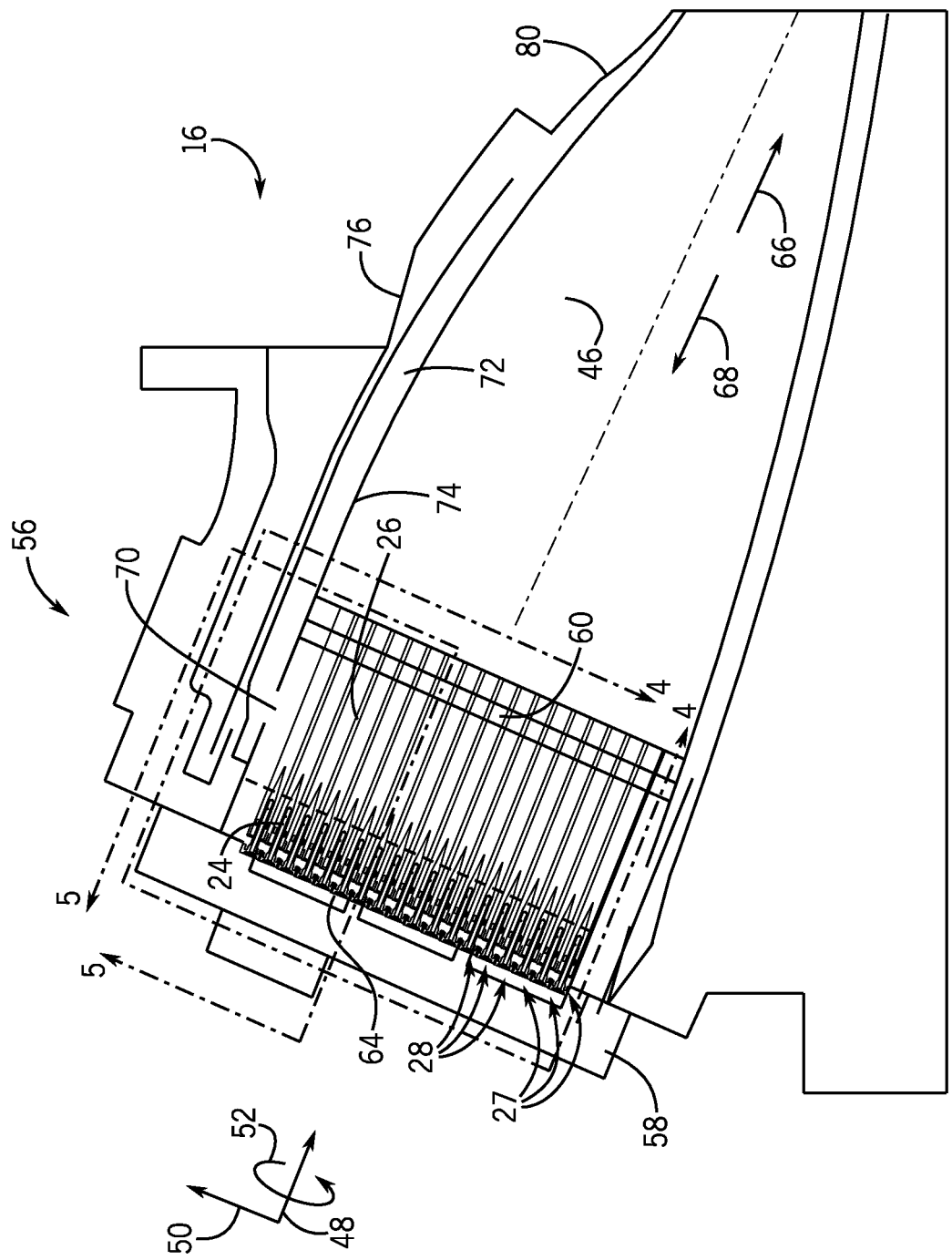
FIG. 3 is a cutaway side view of an embodiment of a portion of the combustor of FIG. 2, taken within line 3-3, having a multi-tube fuel nozzle coupled to an end cover assembly of the combustor.

FIG. 3 is a cutaway side view of the combustor 16 of the gas turbine system 10 of FIG. 2 and taken within line 3-3 of FIG. 2. As shown, the combustor 16 includes a head end 56 and a combustion chamber 46. The fuel nozzle 12 is positioned within the head end 56 of the combustor 16. Within the fuel nozzle 12 are suspended the multiple mixing tubes 26 (e.g. air-fuel pre-mixing tubes). Illustrated is an embodiment of the mixing tubes 26 having air flow conditioners 27 with air entry surfaces 28 that enable compressed air 18 to enter and mix with fuel 22. The mixing tubes 26 generally extend axially between an end cover assembly 58 of the combustor 16 and a cap face assembly 60 of the fuel nozzle 12. The mixing tubes 26 may be coupled to the end cover assembly 58 and the cap face assembly 60, as further described below. The end cover assembly 58 may include a fuel inlet 62 and fuel plenum 64 for providing fuel 22 to multiple fuel injectors 24. As discussed above, each individual fuel injector 24 is coupled to an individual mixing tube 26. During the combustion process, fuel 22 moves axially through each of the mixing tubes 26 from the end cover assembly 58 (via the fuel injectors 24) through the cap face assembly 60 and to the combustion chamber 46. The direction of this movement along the longitudinal axis 54 of the fuel nozzle 12 will be referred to as the downstream direction 66. The opposite direction will be referred to as the upstream direction 68.

As described above, the compressor 20 compresses air 40 received from the air intake 42. The resulting flow of pressurized compressed air 18 is provided to the fuel nozzles 12 located in the head end 56 of the combustor 16. The air enters the fuel nozzles 12 through air inlets 70 to be used in the combustion process. More specifically, the pressurized air 18 flows from the compressor 20 in an upstream direction 68 through an annulus 72 formed between a liner 74 (e.g., an annular liner) and a flow sleeve 76 (e.g., and annular flow sleeve) of the combustor 16. At the end of this annulus 72, the compressed air 18 is forced into the air inlets 70 of the fuel nozzle 12 and fills an air plenum 78 within the fuel nozzle 12. The pressurized air 18 in the air plenum 78 then enters the multiple mixing tubes 26 through the air entry surfaces 28 of the air flow conditioner 27. In addition to allowing the air 18 to enter the mixing tubes 26, the air entry surface 28 of the air flow conditioner 27 may condition the air 18 in various ways, as discussed further below. Inside the mixing tubes 26, the air 18 is then mixed with the fuel 22 provided by the fuel injectors 24. The fuel-air mixture 30 flows in a downstream direction 66 from the mixing tubes 26 into the combustion chamber 46, where it is ignited and combusted to form the combustion gases 32 (e.g., exhaust gases). The combustion gases 32 flow from the combustion chamber 46 in the downstream direction 66 to a transition piece 80. The combustion gases 22 then pass from the transition piece 80 to the turbine 34, where the combustion gases 22 drive the rotation of the blades within the turbine 34.

Figure 4:
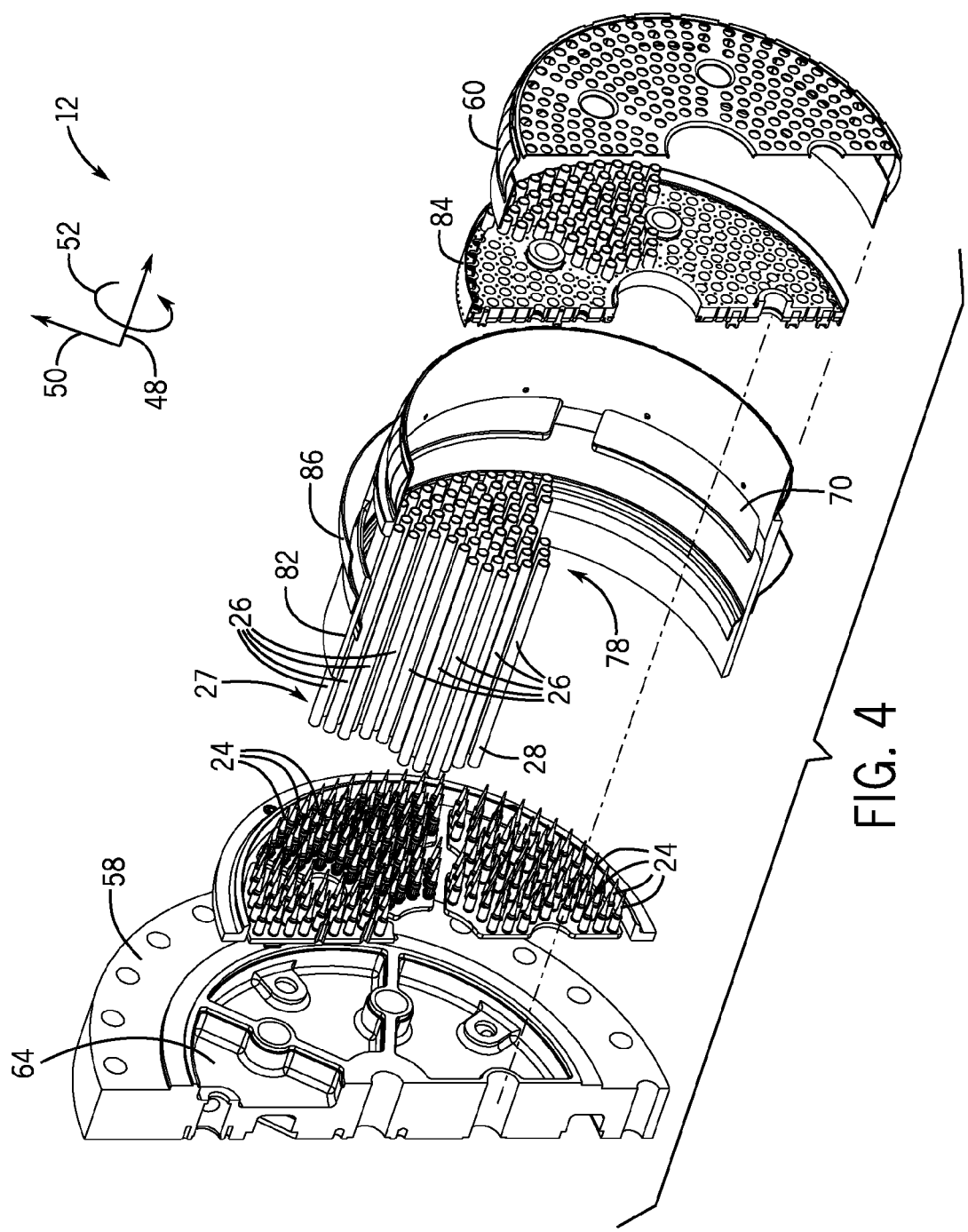
FIG. 4 is an exploded perspective view of a portion of the multi-tube fuel nozzle and end cover assembly of FIG. 3, taken within line 4-4.

FIG. 4 illustrates an exploded perspective view of the multi-tube fuel nozzle 12 taken within line 4-4 of FIG. 3. This figure further illustrates the arrangement, according to some embodiments, of the multiple fuel injectors 24 on the end cover 58 and their relation to the multiple mixing tubes 26. As discussed above, the mixing tubes 26 are arranged to be axially 48 disposed between the end cover assembly 58 and the cap face assembly 60. The individual mixing tubes 26 are each paired with an individual fuel injector 24 and are configured to be disposed about that fuel injector 24 (e.g., in a coaxial or concentric arrangement). The air entry surfaces 28 are located on a first end (e.g., the upstream 68 end) of the mixing tubes 26 in proximity to the fuel injectors 24. In certain embodiments, the fuel injectors 24 may be removably coupled to the end cover assembly 58.

Additionally, FIG. 4 illustrates a support structure 82 (e.g., annular barrel, fuel nozzle cap) of the fuel nozzle 12 that surrounds the mixing tubes 26 and other structures within the fuel nozzle 12. The support structure 82 extends from the end cover assembly 58 to the cap face assembly 60, generally protects and supports the structures positioned within the fuel nozzle 12, and defines the air plenum 78 within the fuel nozzle 12. The air inlets 70 are located on the support structure 82 and direct the compressed air 18 radially into the air plenum 78 on the interior of the fuel nozzle 12. A retainer plate 84 is located upstream 68 and proximate to the removable cap face assembly 60. In certain embodiments, the nozzle 12 includes an annular air flow conditioning diffuser 86 surrounding the air inlets 70.

Figure 5:
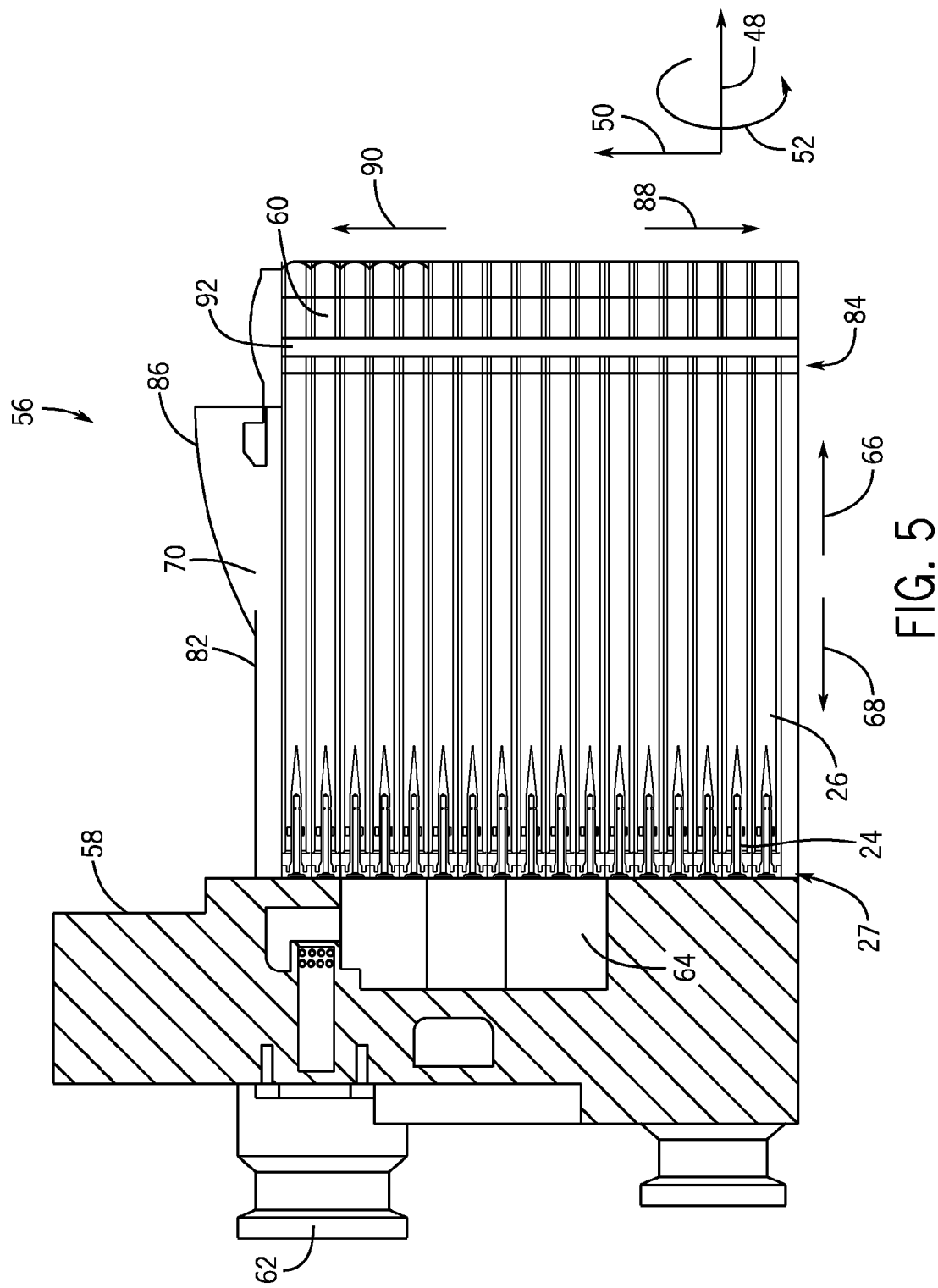
FIG. 5 is a partial cross-sectional view of the combustor of FIG. 3, taken within line 5-5 of FIG. 3.

FIG. 5 is a partial cross-sectional side view of the combustor 16 as taken within line 5-5 of FIG. 3. The head end 56 of the combustor 16 contains a portion of the multi-tube fuel nozzle 12. The support structure 82 surrounds the multi-tube fuel nozzle 12 and the multiple mixing tubes 26. As discussed above, in some embodiments, each mixing tube 26 may extend axially between the end cover assembly 58 and the cap face assembly 60. The mixing tubes 26 may further extend through the cap face assembly 60 to feed the fuel-air mixture 30 directly to the combustion chamber 46. Each mixing tube 26 is positioned to surround a fuel injector 24 (e.g., coaxial or concentric arrangement), such that the injector 24 receives fuel 22 from the fuel plenum 64 and directs the fuel into the tube 26. The fuel plenum 64 is fed fuel 22 entering the fuel inlet 62 located on the end cover assembly 58.

As described above, compressed air 18 enters the fuel nozzle 12 through air inlets 70, which may be surrounded by a diffuser 86. The diffuser 86 may be annular and configured to pre-condition and distribute the pressurized air into the fuel nozzle 12 across the mixing tubes 26 in a variety of directions. The direction of the air flow within the fuel nozzle 12 will be substantially radially inward 88, but may have an upstream 68 component or downstream 66 component. The air flow will vary across mixing tubes 26 that are located in more radially outward 90 locations within the fuel nozzle 12, closer to the air inlets 70. After entering the fuel nozzle 12 through the air inlet 70 and moving across the mixing tubes 26, the pressurized air 18 enters each mixing tube 26 through an air entry surface 28 of an air flow conditioner 27. In certain embodiments, the configuration of the air entry surfaces 28 of the air flow conditioners 27 is varied among individual mixing tubes 26 based on their radial 50 locations within the fuel nozzle air plenum 78. This customization can compensate for the variations in air pressure and movement across the mixing tubes 26, namely the pressure drop that occurs in the radially inward 88 direction. In certain embodiments, the axial 48 position of the air entry surfaces 28 along the mixing tubes 26 may be varied to compensate for axial 48 variations in air pressure. For additional management of the flow of pressurized air 18 the air entry surfaces 28 of the air flow conditioner 27 located on an upstream end 94 (e.g., a first end) of the mixing tube 26 may be configured to have any of a variety of shapes, sizes, and arrangements as will be further discussed below. As also shown in FIG. 5, in some embodiments, the retainer plate 84 and/or an impingement plate 92 may be positioned within the fuel nozzle 12 surrounding the downstream end 96 of the mixing tubes 26 generally proximate to the cap face assembly 60. The impingement plate 92 may include a plurality of impingement cooling orifices, which may direct jets of air to impinge against a rear surface of the cap face assembly 60 to provide impingement cooling.

Figure 6:
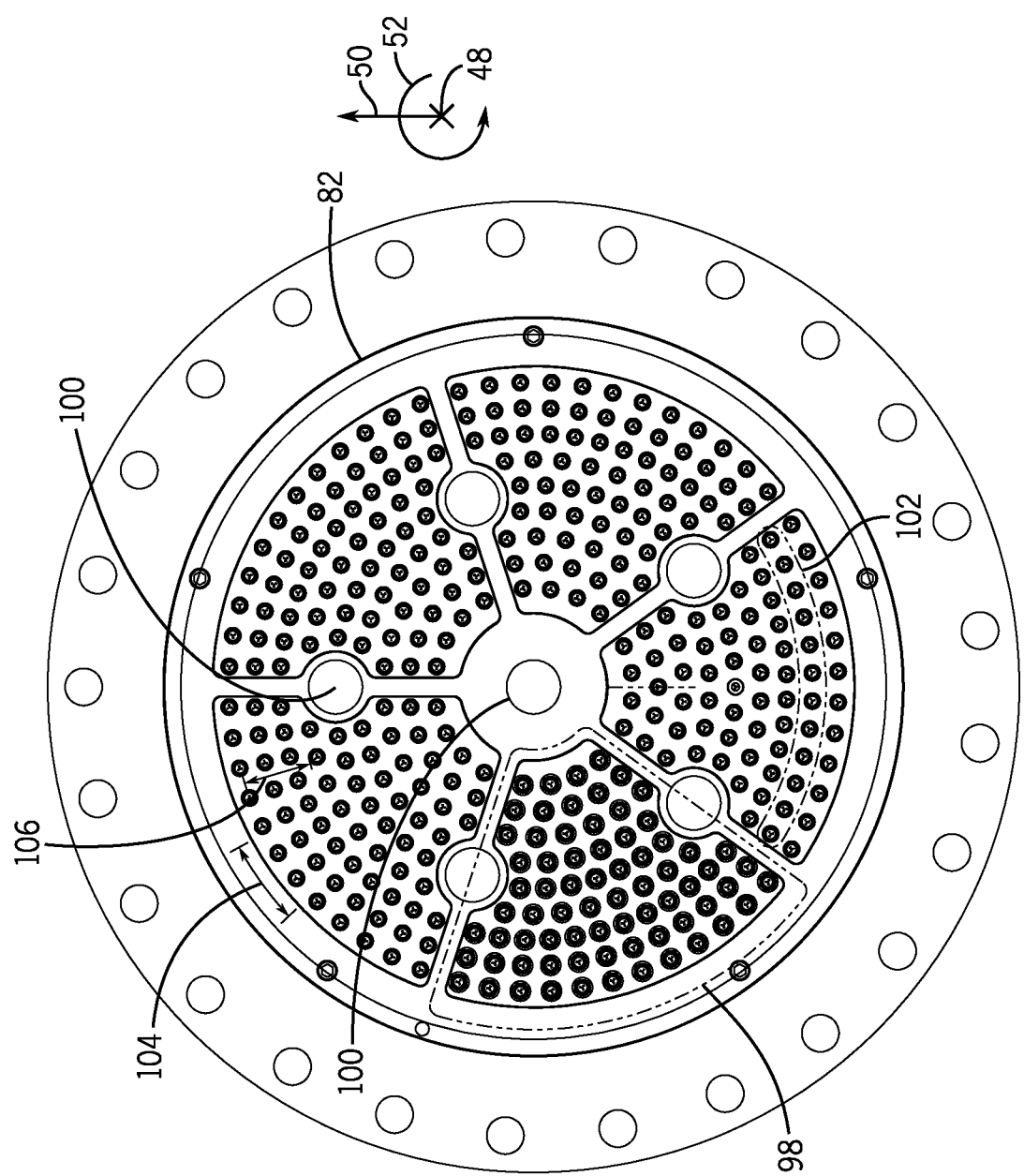
FIG. 6 is a front view of the cap face assembly of an embodiment of the multi-tube fuel nozzle of FIG. 3, illustrating multiple tubes and fuel injectors of the multi-tube fuel nozzle.

FIG. 6 is a front view of an embodiment of the multi-tube fuel nozzle 12 illustrating the radial layout of the multiple mixing tubes 26. The illustrated nozzle 12 includes multiple sectors 98 arranged circumferentially 52 on the cap face assembly 60. The arrangement of the mixing tubes 26 affects the clearances between the tubes 26, and also the clearances between the air entry surfaces 28 among adjacent tubes 26. The illustrated nozzle 12 includes a single liquid fuel cartridge 100 placed in between each sector 98, and an additional liquid fuel cartridge 100 in the center of the cap face assembly 60. The liquid fuel cartridges 100 supply the fuel nozzle 12 with liquid fuel 22. In the present embodiment, each sector 98 includes of multiple rows 102 of mixing tubes 26, each row 102 having two or more tubes 26. The circumferential distance 104 between each tube 26 in each row 102 is substantially equal. The radial distance 106 between each row 102 in each sector 98 is also substantially equal. This results in substantially equal clearances between the tubes 26 and equal clearances between the air entry surfaces 28 of the tubes 26. In other embodiments, there may be different numbers of sectors 98. For example, there may be 1 to 20 sectors 98 (e.g., 2, 3, 4, 5, 6, 7, 8, 9, or 10). Each sector 98 may have various numbers of mixing tubes 26. For example, each sector may have 50, 100, 150, 200, or any other number of tubes 26. Additionally, it is contemplated that the tubes 26 may be arranged with non-uniform spacing (e.g., varying circumferential distance 104 and/or radial distance 106) to manage any air pressure drops within the fuel nozzle 12. For example, the circumferential space 104 between adjacent tubes 26 can be varied based on their proximity to the air inlets 70. In certain embodiments, the circumferential space 104 between the tubes 26 may be greater at locations with closer proximity to air inlets 70 (e.g., where air pressure is greater) and decreased at locations within the fuel nozzle 12 (e.g., where air pressure has dropped). This arrangement may more evenly distribute air pressure around the circumference 52 of the fuel nozzle. Further, various arrangements of tubes 26 can sustain flow conditions of compressed air 18 prior to entry into the mixing tubes 26 so that the conditions (e.g., pressure, velocity) may be substantially matched to flow conditions of the compressed air after entering the tubes 26. Additionally, the radial distance 106 between rows 96 may similarly vary based on their proximity to the air inlets 70 to manage air pressure and velocity radially within the fuel nozzle 12. The arrangement of the individual tubes 26 may be determined to compensate for pressure drops that may occur inside the fuel nozzle 12 due to other structures, such as the liquid fuel cartridges 100. For example, a structure may cause a disturbance in fuel pressure, and such disturbance can be reduced or avoided by the placement of mixing tubes 26.

Figure 7:
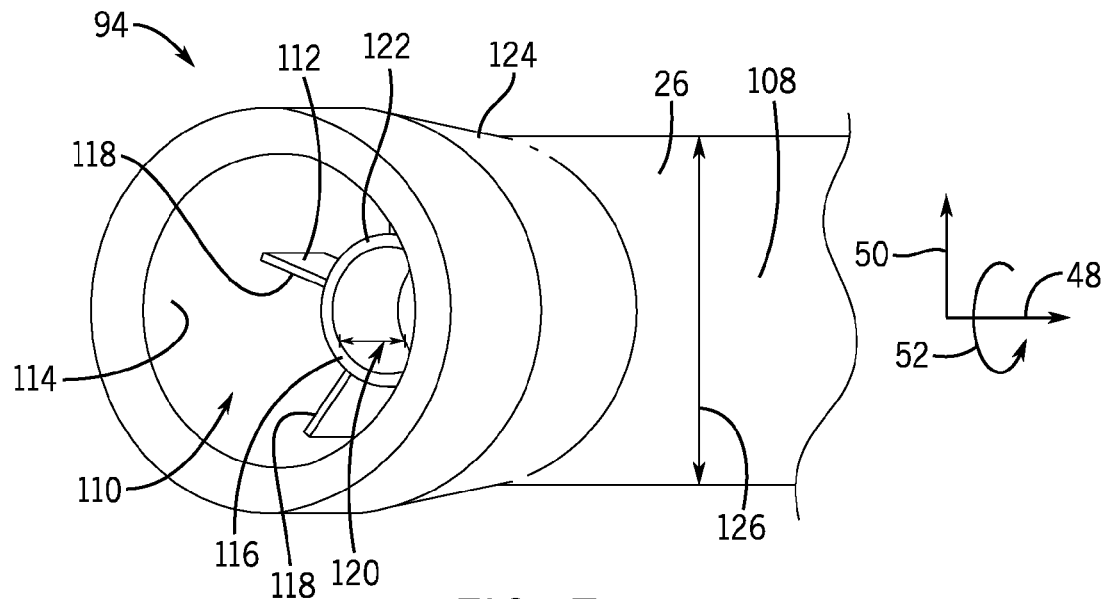
FIG. 7 is a perspective view of an upstream end of an individual tube of the multi-tube fuel nozzle illustrating an air flow conditioner, taken within line 7-7 of FIG. 4.

FIG. 7 is a perspective view of an upstream end 94 of an individual tube 26 of the multi-tube fuel nozzle 12 defined by an annular wall 108. The tube 26 includes a central passage 110 disposed within the annular wall 108, wherein supports structures 112 extend radially inward from an inner surface 114 of the tube 26 to a support ring 116. The support structures 112 and the support ring 116 support the fuel injector 24 within the mixing tube 26, thereby limiting radial movement of the fuel injector 24 relative to the tube 26. The individual support structures 112 may be of any shape or size that will give adequate foundation for the support ring 116, while also allowing air flow past the support structures 112. The edges 118 of the support structures 112 may be angular or contoured, or have a combination or angular and contoured surfaces. For example, the support structured 112 may have an airfoil shaped cross-section to reduce flow resistance. The depth 120 of the support structures 112 may vary, and each individual support structure 112 may be located within the mixing tube 26 at positions further upstream 68 or downstream 66 in order to better manage any disturbance of pressurized air 18. There may be a single or multiple support structures 112 coupled to the support ring 116. The support ring 116 may also be of different shapes and sizes. For example, the edges 122 of the support ring 116 may be angular, contoured, or have a combination of angular and contoured surfaces. As illustrated, the outer surface 124 of the annular wall 108 of the mixing tube 26 decreases in diameter 126 from upstream end 94 to downstream end 96 of the annular wall 108. This configuration may allow for smooth movement of air flow in an axial 48 direction across the outer surface 124 of the annular wall 108 of the mixing tube 26. In other embodiments, the diameter 126 of the outer surface 124 may stay constant or may increase along the downstream 66 axial 48 direction. These various configurations may allow for variable management of the air 18 flow. For example, for mixing tubes 26 located in more radially 50 inward locations within the fuel nozzle 12, air pressure of the air 18 entering the fuel nozzle 12 may be lower in areas further away from the air inlets 70 of the fuel nozzle 12. This decrease in air pressure may be compensated for by an increased diameter 126 of the outer surfaces 124 of the mixing tubes 26, decreasing the available volume on the outside of and between the mixing tubes 26. This decrease in available volume helps to accelerate air flow into the air inlets 28.

Figure 8:
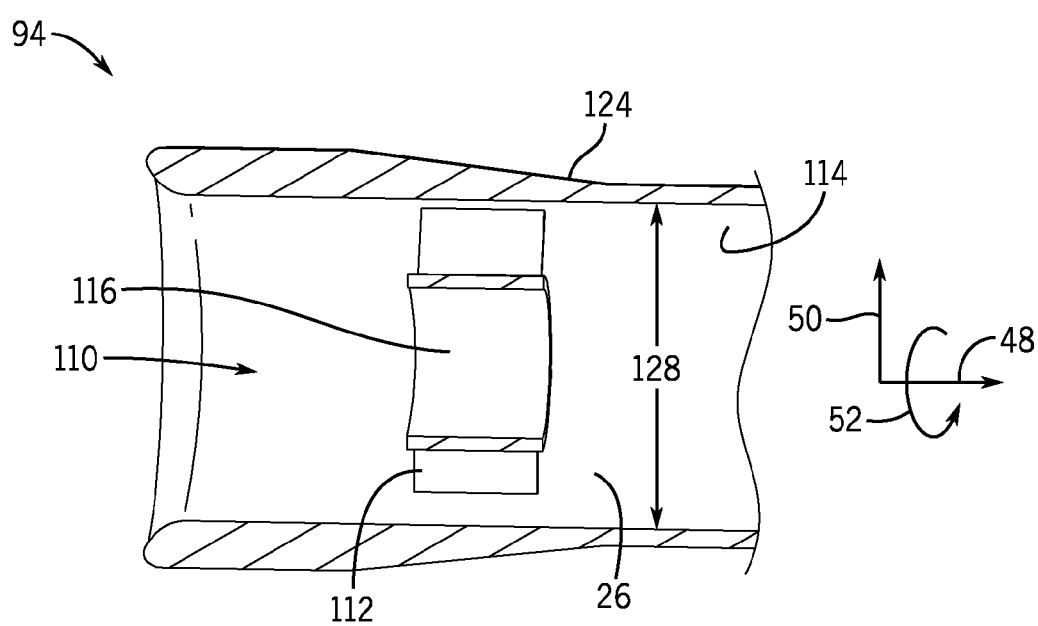
FIG. 8 is a cutaway view of the upstream end of an individual tube of the multi-tube fuel nozzle of FIG. 7 illustrating details of an air flow conditioner.

FIG. 8 is a cutaway perspective view of the same upstream end 88 of the mixing tube 26. Shown are the support structures 112 and support ring 116 disposed within the inner surface 114 of the mixing tube 26. The inner surface 114 has a diameter 128 that is constant from upstream end 94 to downstream end 96 of the annular wall 108. Thus, as the change in diameter 126 of the outer surface 124 allows for management of air flow surrounding the mixing tube 26, the constant diameter 128 of the inner surface 114 of the mixing tube 26 enables selective management of airflow within the central passage 110 of the mixing tube 26. The constant inner diameter 128 allows for smooth movement of air flow, avoiding wakes, separations and losses that may occur due to blockage of fuel flow. The decrease in diameter 128 changes in the internal volume of the inner passage 110 allowing management of air pressure within the mixing tube 26. Mixing tubes 26 may be configured to have a larger or smaller outer diameter 126, and greater of lesser changes in outer diameter 126 in the axial direction to customize air flow depending on location of the tube 26 within the fuel nozzle 12.

FIG. 9 is a cross-sectional side view of an embodiment of the downstream end 96 of the mixing tube 26 as assembled with the cap face assembly 60, taken within line 9-9 of FIG. 6. Illustrated is an embodiment of the spatial relationship among the mixing tubes 26, the cap face assembly 60, and/or the end cover assembly 58. In some embodiments, the mixing tubes 26 may be attached to components within the head end 56 of the combustor 16, such as the cap face assembly 60, the retainer plate 84, and/or the impingement plate 92 by various fasteners or connections, such as weld, brazed joints, brackets, threaded fasteners, snap-fits, joints, or other connections. In other embodiments, the mixing tubes 26 are held in a floating configuration and are merely supported by one or more of the cap face assembly 60, the retainer plate 84, the impingement plate 92, various springs, or other supporting structures. Such floating configurations may advantageously accommodate thermal growth of the mixing tubes 18 and other components of the combustor 14. Floating configurations also allow the customization and configuration of mixing tubes 26 with various air port 28 configurations to be more easily made. If fuel-air mixtures 20 are found to be non-uniform, individual tubes 26 may be easily removed and replaced with tubes 26 that have different air port 28 (e.g. air flow conditioner 27) configurations that better compensate for air pressure variations within the fuel nozzle 12. The floating configurations may additionally be implemented by the inclusion of an axial spring 130 to provide resilient axial 48 support and constraint to the movement of the mixing tubes 26. In accordance with the illustrated embodiment, the axial spring 130 may be positioned between a retainer plate 84 and impingement plate 92. There may further be features implemented such as additional springs, channels and/or guides, to block radial 50 or circumferential 52 movement of the mixing tubes 26.

FIG. 10 is a cross-sectional side view of an embodiment of the mixing tube 26 installed about the fuel injector 24, as taken within line 10-10 of FIG. 6. As discussed above, the fuel injector 24 is positioned on the head end 56 of the fuel nozzle 12 and receives fuel from the fuel plenum 64. When fully assembled, the fuel injector 24 may be generally positioned within the central passage 110 in the first end 94 of each mixing tube 26. This first end 94 is located on the upstream 68 side of the multi-tube fuel nozzle 12, adjacent to the end cover assembly 58. The air entry surfaces 28 are located on this first end 94 generally proximate or adjacent to the head end 56. In some embodiments, the fuel injector 24 may extend further downstream and the air inlets 28 may accordingly also be located in locations further downstream 66 from the head end 56. The configuration of the air inlets 28 can further be configured to manage air 18 flow within the central passage 110 of the mixing tube 26. As discussed above, the outer surface 124 of the annular wall 108 of an individual mixing tube 26 may have a diameter 126 that decreases along the axial 48 downstream 66 direction, improving the air flow on the exterior of the mixing tubes 26. Further, the inner surface 114 of the annular wall 108 of the mixing tube 26 may have a diameter 128 that is constant along the axial 48 downstream 66 direction, avoiding disturbances in the flow of pressurized air 18 within the central passage 110 of the mixing tube 26. The tube 26 also includes a turn portion 134 between the outer surface 124 of the annular wall 108 and inner surface 114 of the annular wall 108 wherein the turn portion 134 (e.g., contoured turn portion) connects the inner 114 and outer surfaces 124 of the mixing tube 26 annular wall 108. This turn portion 134 of the tube 26 may be angular (e.g., conical surface) or contoured (e.g., curved annular surface) in order to minimize and manage air flow disturbances as pressurized air 18 enters the central passage 110. The turn portion 122 may help gradually turn the air flow into the tube 26, while helping to eliminate any low velocity regions a generation of turbulence. When the inner surface 114, outer surface 124, and turn portion 134 are composed of contoured surfaces, the upstream end 94 of the mixing tube may form a bell-shape, e.g., a curved annular surface that gradually decreases in diameter 126 in a curved manner. Fuel is delivered to a central passage 136 of the fuel injector 24 and is dispersed through fuel ports 138 into the central passage 110 of the mixing tube 26. In the illustrated embodiment, the fuel ports 138 are located on the tapered portion 140, which may have a linear or curved taper in the downstream direction 66. For example, the tapered portion 140 may be formed as a conical wall, an inwardly curved annular wall (e.g., curved inwardly toward the axis of the injector 24), an outwardly curved annular wall (e.g., curved outwardly away from the axis of the injector 24), or a combination thereof. In the illustrated embodiment, a tapered portion 140 extends from a first position upstream 68 of the air ports 28 to a second position downstream 66 of the air ports 28 of the mixing tube 26. As illustrated, the tapered portion 140 of the fuel injector 24 gradually decreases in diameter (i.e., converges) in the downstream direction 66, thereby gradually increasing the cross-sectional area between the fuel injector 24 and the mixing tube 26 in the downstream direction 66. In this manner, the illustrated embodiment provides a gradual pressure drop between the fuel injector 24 and the mixing tube 26, thereby helping to improve the flow and mixing of fuel and air. In the illustrated embodiment, the air flow conditioner 27 (e.g., air inlet 28) along the mixing tube 26 and the fuel ports 138 along the fuel injector 24 (e.g., tapered portion 140) are both disposed upstream from a tip 142 of the fuel injector 24, such that the air and fuel at least partially mix along the decreasing cross-sectional area between the fuel injector 24 and the mixing tube 26. Furthermore, the illustrated air inlet 28 is disposed upstream of the fuel ports 138 to increase the pressure upstream of the fuel ports 138.

FIG. 11 shows a portion of the embodiment of the mixing tube and fuel injector of FIG. 11, illustrating details of the flow of pressurized air 18 as it enters the mixing tube 26 and is conditioned by the air flow conditioner 27. As discussed above, contouring of the outer surface 124 of the tube 26 facilitates accelerated movement 150 of the pressurized air along the outer surface 124 of the tubes 26. Clearances between adjacent tubes are designed to match flow conditions prior entry into the tube and after entry to the tube and to accelerate incoming air flow 152 into the tubes. The contouring along the turn portion 134 of the annular wall that defines the mixing tube 26 acts to gradually increase cross-sectional area of the tube 144 at the turn portion and reduce turning losses in pressure. Because the inner diameter 128 of the tube 26 is constant in the dire FIG. 11 shows a portion of the embodiment of the mixing tube and fuel injector of FIG. 11, illustrating details of the flow of pressurized air 18 as it enters the mixing tube 26 and is conditioned by the air flow conditioner 27. As discussed above, contouring of the outer surface 124 of the tube 26 facilitates accelerated movement 150 of the pressurized air along the outer surface 124 of the tubes 26. Clearances between adjacent tubes are designed to match flow conditions prior entry into the tube and after entry to the tube and to accelerate incoming air flow 152 into the tubes. The contouring along the turn portion 134 of the annular wall that defines the mixing tube 26 acts to gradually increase cross-sectional area of the tube 144 at the turn portion and reduce turning losses in pressure. Because the inner diameter 128 of the tube 26 is constant in the direction of flow, while the outer diameter 126 decreases, the cross-sectional area 146 also gradually decreases until it is constant 148 in downstream portions of the tube. This decrease in cross-sectional area defines the bell shaped portion of the tube 26. The gradual contour of the turn portion 134 is located at the upstream end of the bell shaped portion and minimizes flow separation, and provides a preferable pressure and velocity profile for the incoming air 152. Once the pressurized air 18 has entered the mixing tube 26 via the air inlet 28 the contoured inner surface 114 additionally provides axial acceleration 154 of the air 18 along the central passage 110 of the mixing tube. The increased axial movement 154 of the air 18 upstream of the fuel ports 138 on the fuel injector 24 act to minimize blockage of fuel 22 entering 156 the mixing tube 26 and improve mixing of fuel 22 and air 18. Overall pressure drops are reduced and flame-holding risks are mitigated by the contoured surfaces 124, 134, and 114.

Figure 12:
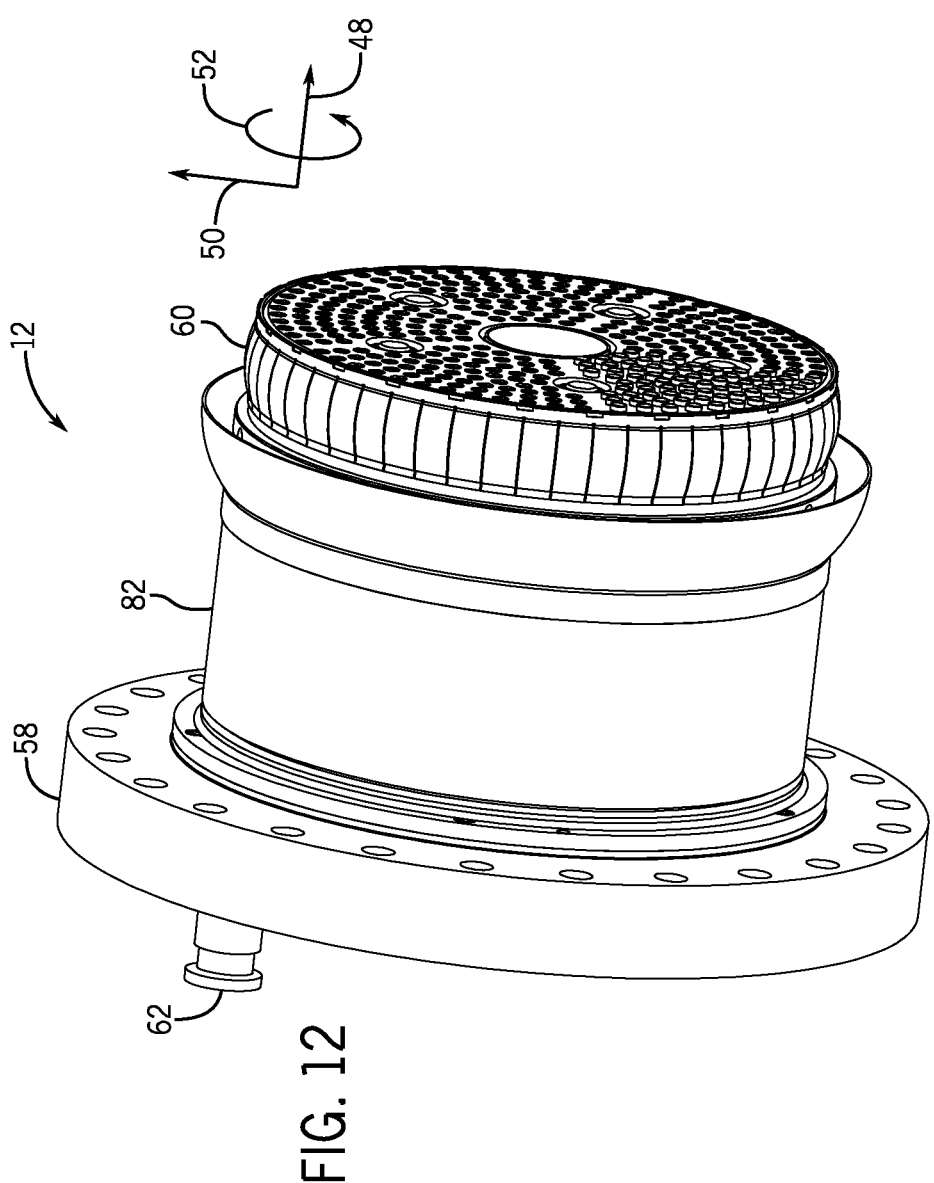
FIGS. 12-15 are a series of views of an embodiment of a multi-tube fuel nozzle and a combustor end cover, illustrating a method of removal of tubes of the multi-tube fuel nozzle.
Figure 13:
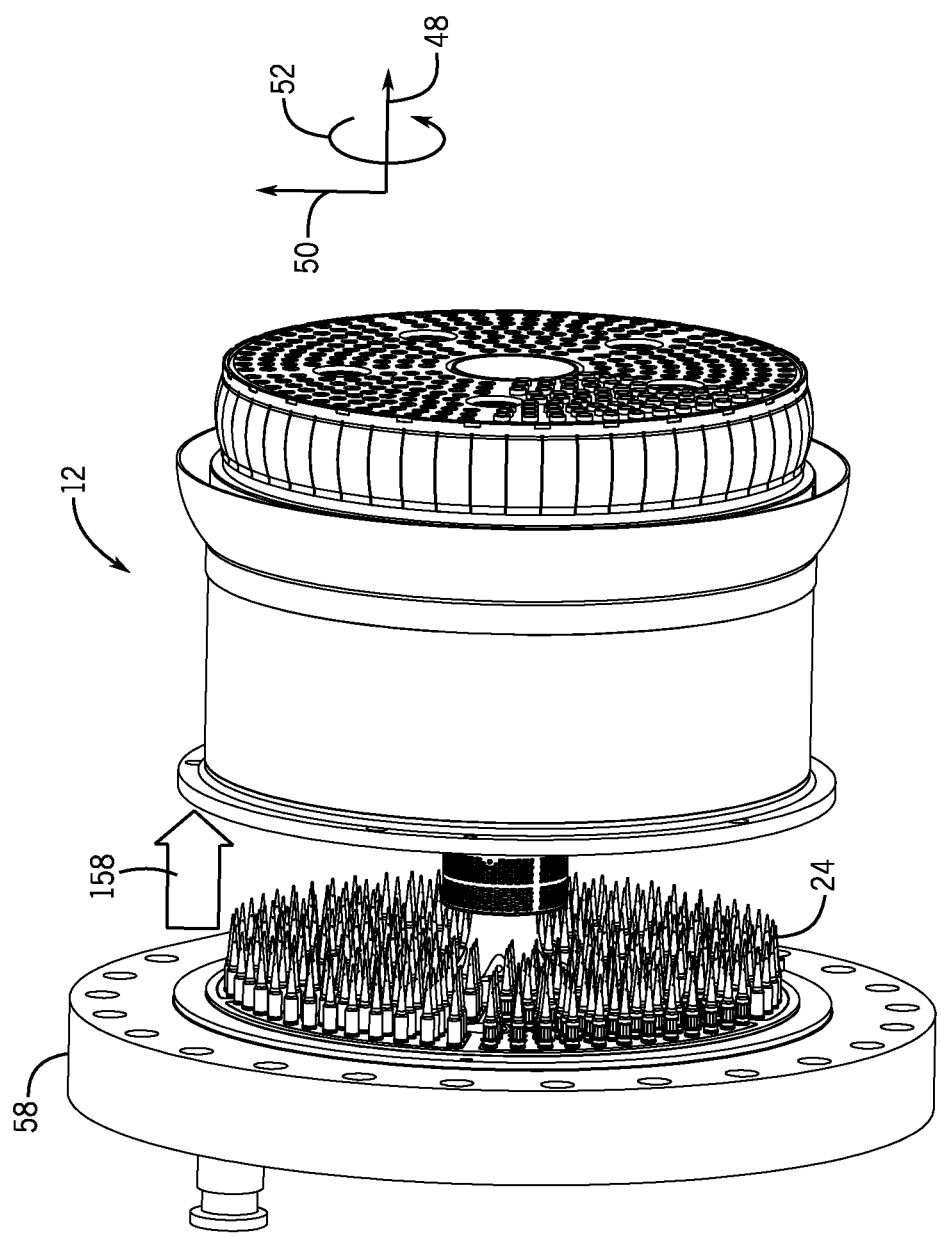
Figure 14:
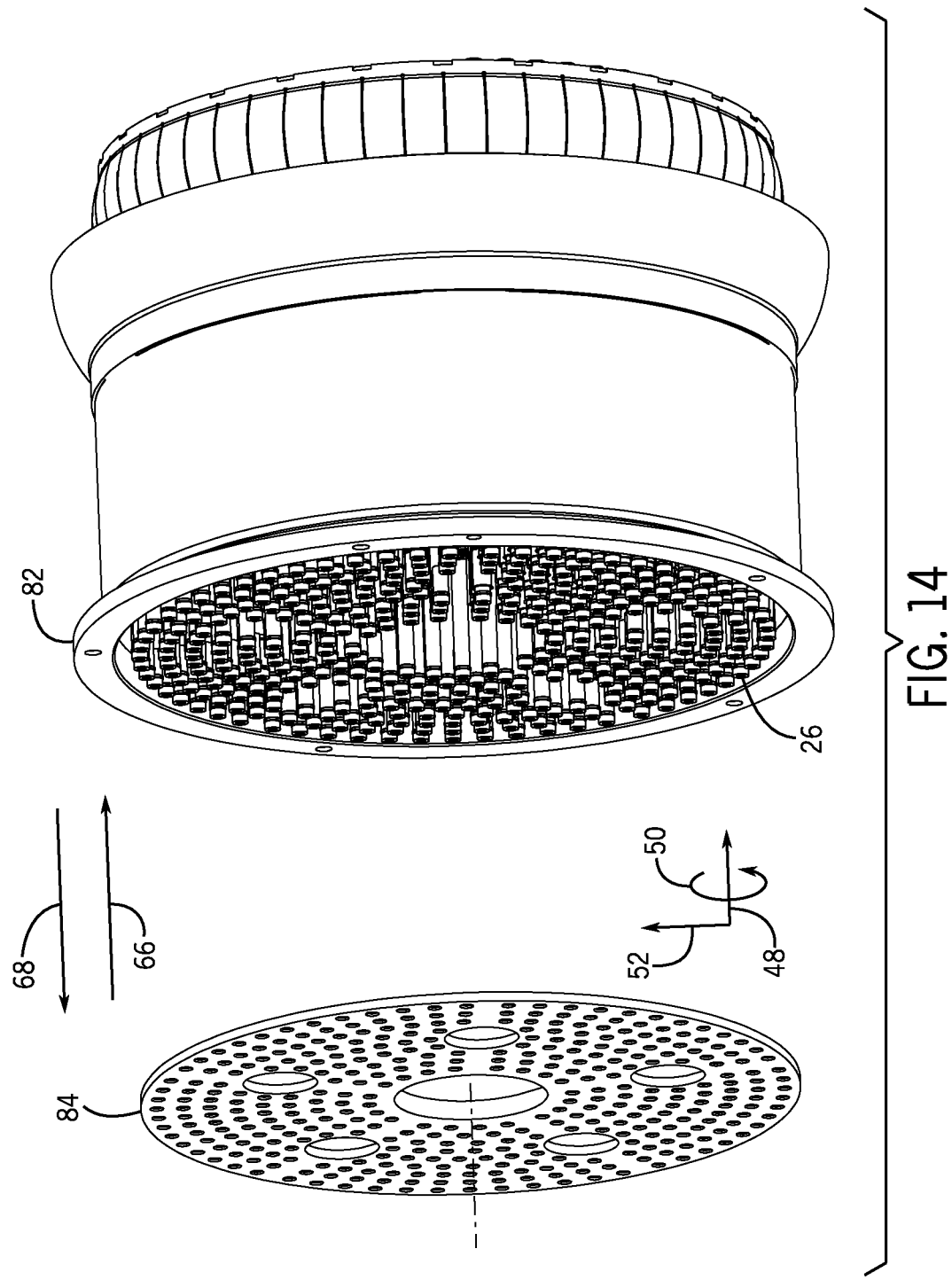
Figure 15:
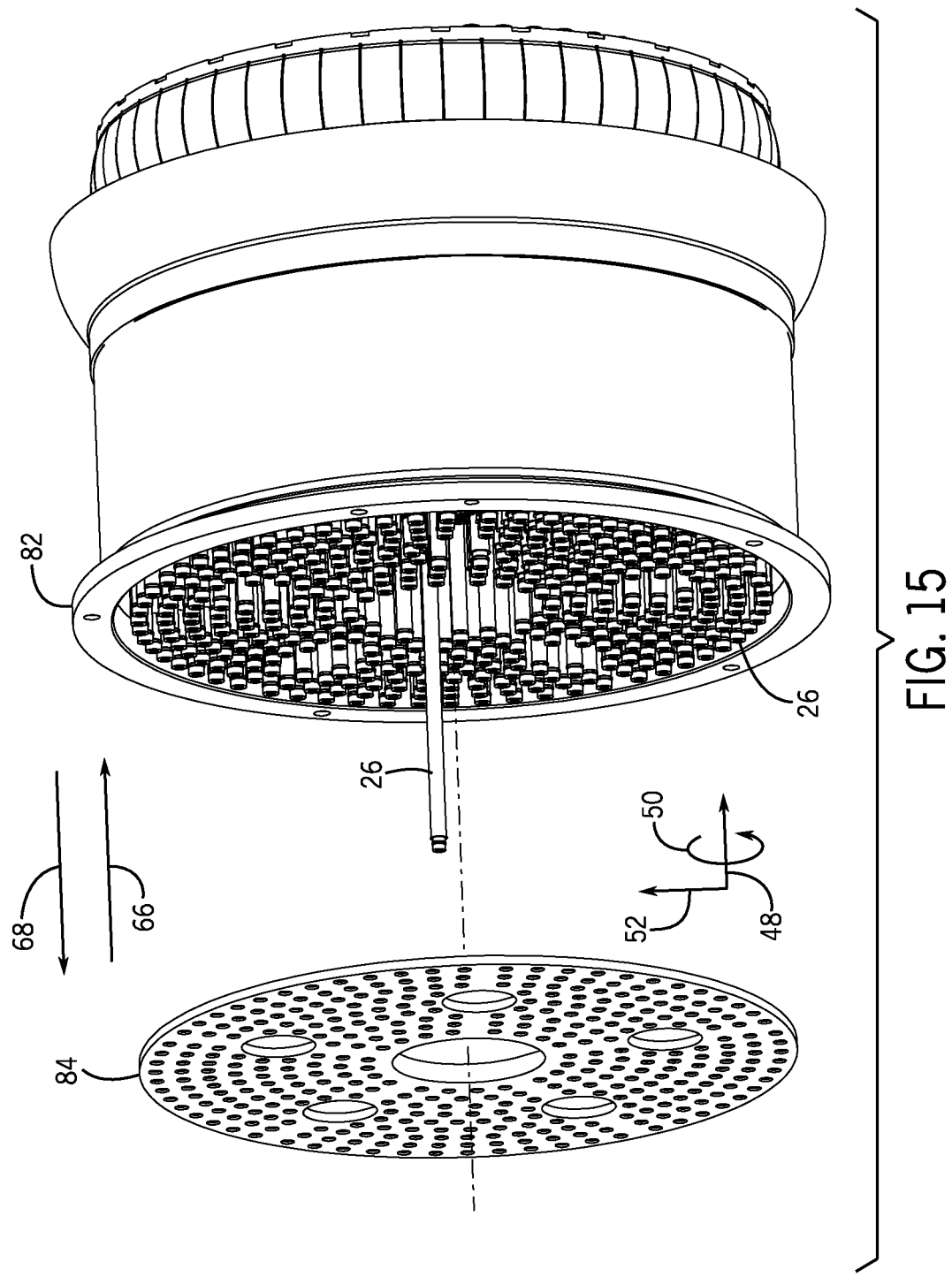

FIGS. 12-15 are perspective views of the fuel nozzle 12, illustrating a series of steps of a method for removing at least one mixing tube 26 in accordance with certain embodiments. As illustrated in FIG. 12, the multi-tube fuel nozzle 12 is removed from the head end 56 of the combustor 16 and coupled to the end cover assembly 58. Illustrated is the end cover assembly 58 with fuel inlet 62 coupled with the support structure 82 and cap face assembly 60. To access the mixing tubes 26, as illustrated in FIG. 13, the end cover assembly 58 is separated 158 from the support structure 82 and cap face assembly 60. FIG. 13 reveals the fuel injectors 24 coupled to the end cover assembly 58 of the fuel nozzle 12. Next, as shown in FIG. 14, the retainer plate 84 is removed from the cap face assembly 60 by sliding the retainer plate 84 along the mixing tubes 26 in an upstream 68 direction from the second end 96 to the first end 94 of the mixing tubes 26. As shown in FIG. 15, the mixing tubes 26 may then be removed from their location on the cap face assembly 60. Removal of one or more mixing tubes 26 may allow for inspection, replacement, repair, or any other purpose found in the course of manufacturing, installation, and operation of the fuel nozzle 12. Installation of mixing tubes 26 is achieved by following the steps illustrated in FIGS. 12-15 in reverse order. Namely, the one or more mixing tubes 26 may be inserted in place on the cap face assembly 60 (FIG. 15), then the retainer plate 84 installed by sliding across the mixing tubes 26 from the first end 94 to the second end 96, until the tubes 26 are flush with the cap face assembly 60 and/or impingement plate 92 (FIG. 14). The support structure 82 is then coupled with the end cover assembly 58 by aligning the mixing tubes 26 with their respective fuel injectors 24 (FIG. 13). The assembled fuel nozzle 12 (FIG. 12) may then be installed into the head end 56 of the combustor 12.

Technical effects of the disclosed embodiments include systems and methods for improving the mixing of the air 40 and the fuel 14 within multi-tube fuel nozzles 12 of a gas turbine system 10. In particular, the fuel nozzle 12 is equipped with multiple mixing tubes 26 having air inlets 28 through which pressurized compressed air 18 that enters the fuel nozzle 12 is directed and mixes with fuel 22 injected by multiple fuel injectors 24. The air inlets 28 may be configured with different shapes, sizes, spatial arrangements, and configured to direct the air at various angles. This customization increases mixing and uniformity, compensating for the varying air 18 and fuel 22 pressures among the multiple fuel injectors 24 in the multi-tube fuel nozzle 12. The increased mixing of the air 18 and the fuel 22 increases the flame stability within the combustor 16 and reduces the amount of undesirable combustion byproducts. The method of removal and replacement of individual mixing tubes 26 allows for cost-effective and efficient repair of the fuel nozzle 12.

Although some typical sizes and dimensions have been provided above in the present disclosure, it should be understood that the various components of the described combustor may be scaled up or down, as well as individually adjusted for various types of combustors and various applications. This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

The invention claimed is:

1. A system for injecting fuel, comprising:
   a multi-tube fuel nozzle, comprising:
      a plurality of mixing tubes wherein each mixing tube comprises:
         an annular wall disposed about a central passage, wherein the central passage extends from an upstream end to a downstream end of the annular wall relative to a direction of flow through the central passage; and
         an air inlet region configured to be disposed about a fuel injector extending into the central passage, wherein the air inlet region comprises an air entry region of the annular wall comprises a bell-shaped portion;
      wherein an outer diameter of each mixing tube initially increases from the upstream end prior to the bell-shaped portion and then continuously decreases through the bell-shaped portion in the direction of flow toward the downstream end, and an inner diameter of each mixing tube initially decreases from the upstream end prior to the bell-shaped portion and then remains constant in the direction of flow toward the downstream end of the annular wall.

2. The system of claim 1, wherein the air entry surface comprises a contoured surface at the upstream end of the annular wall.

3. The system of claim 2, wherein the contoured surface comprises a contoured outer surface, a contoured inner surface, and a contoured turn portion disposed between the contoured outer surface and the contoured inner surface.

4. The system of claim 1, comprising a plurality of fuel injectors, wherein each mixing tube has one of the fuel injectors disposed in the upstream end of the mixing tube.

5. The system of claim 1, comprising a gas turbine engine or a combustor having the multi-tube fuel nozzle.

6. The system of claim 1, wherein the plurality of mixing tubes comprises at least 50 mixing tubes.

7. The system of claim 1, wherein the multi-tube fuel nozzle comprises a plurality of fuel injectors and a common fuel plenum, and wherein each mixing tube of the plurality of mixing tubes has a first end and a second end, a respective first end of each mixing tube of the plurality of mixing tubes is disposed about a respective fuel injector of the plurality of fuel injectors, and each mixing tube of the plurality of mixing tubes is coupled to the common fuel plenum to receive fuel.

8. The system of claim 1, wherein the multi-tube fuel nozzle comprises a plurality of fuel nozzle sectors, and each fuel nozzle sector comprises at least 50 mixing tubes.

9. The system of claim 1, wherein the plurality of mixing tubes is arranged concentrically in a plurality of rows about a central axis of the multi-tube fuel nozzle, and wherein a circumferential distance relative to the central axis between each mixing tube of the plurality of mixing tubes in each respective row of the plurality of rows is equal, a radial distance relative to the central axis between each mixing tube of the plurality of mixing tubes in each respective row of the plurality of rows is equal, and clearances between respective air entry regions of adjacent mixing tubes of the plurality of mixing tubes is equal.

10. A system for injecting fuel, comprising:
an end cover assembly and a multi-tube fuel nozzle, the multi-tube fuel nozzle comprising:
a retainer plate; and
a plurality of mixing tubes disposed between the end cover assembly and the retainer plate wherein the retainer plate is disposed about each downstream end of each mixing tube of the plurality of mixing tubes, and wherein each mixing tube comprises:
an annular wall disposed about a central passage, wherein the central passage extends from an upstream end of the annular wall adjacent the end cover assembly to a downstream end of the annular wall adjacent the retainer plate; and
an air inlet region configured to be disposed about a fuel injector extending into the central passage, wherein the air inlet region comprises an air entry surface comprising a bell-shaped portion of the annular wall;
wherein an outer diameter of each mixing tube initially increases from the upstream end prior to the bell-shaped portion and then continuously decreases through the bell-shaped portion in the direction of flow toward the downstream end, and an inner diameter of each mixing tube initially decreases from the upstream end prior to the bell-shaped portion and then remains constant in the direction of flow toward the downstream end of the annular wall.

11. The system of claim 10, wherein each mixing tube of the plurality of mixing tubes is configured to be individually removed from or installed between the end cover assembly and the retainer plate.

12. The system of claim 11, wherein the retainer plate is configured to be removed from the multi-tube fuel nozzle by sliding the retainer plate along the plurality of mixing tubes from the upstream end to the downstream end.

13. The system of claim 10, wherein the air entry surface of each of the mixing tubes comprises an outer surface of the annular wall that gradually decreases in diameter in the direction of flow.

14. The system of 10, wherein the air entry surface of each of the mixing tubes comprises an inner surface that gradually decreases in diameter in the direction of flow.

15. The system of claim 14, wherein a cross-sectional area within the inner surface of each air inlet region increases adjacent a region of fuel injection from the fuel injector.

16. The system of claim 10, wherein the bell-shaped portion of the air entry surface of each of the tubes comprises a contoured outer surface, a contoured inner surface, and a contoured turn portion disposed between the contoured outer surface and the contoured inner surface.

17. The system of claim 10, wherein the plurality of mixing tubes comprises at least 50 mixing tubes.

18. A system for injecting fuel, comprising:
an end cover assembly and a multi-tube fuel nozzle, the multi-tube fuel nozzle comprising:
a retainer plate; and
a plurality of tubes disposed between the end cover assembly and the retainer plate, wherein the retainer plate is disposed about a downstream end of each of the plurality of tubes, wherein the plurality of tubes is arranged concentrically in a plurality of rows about a central axis of the multi-tube fuel nozzle, wherein a circumferential distance relative to the central axis between each tube of the plurality of tubes in each respective row of the plurality of rows is equal, a radial distance relative to the central axis between each tube of the plurality of tubes in each respective row of the plurality of rows is equal, and clearances between respective air entry regions of adjacent tubes of the plurality of mixing tubes is equal, and wherein each tube of the plurality of tubes comprises:
an annular wall disposed about a central passage, wherein the central passage extends from an upstream end of the annular wall adjacent the end cover assembly to a downstream end of the annular wall adjacent the retainer plate,
an air inlet region configured to be disposed about a fuel injector extending into the central passage, wherein the air inlet region comprises an air entry surface comprising a bell-shaped portion of the annular wall;
wherein an outer diameter of each mixing tube initially increases from the upstream end prior to the bell-shaped portion and then continuously decreases through the bell-shaped portion in the direction of flow toward the downstream end, and an inner diameter of each mixing tube initially decreases from the upstream end prior to the bell-shaped portion and then remains constant in the direction of flow toward the downstream end of the annular wall.

19. The system of claim 18, wherein the tube is configured to be removed from or installed between the end cover assembly and the retainer plate.

20. The system of claim 18, wherein the tube has a diameter between 0.5 centimeters (cm) to 2 cm.

* * * * *